United States Patent
Wu et al.

(10) Patent No.: US 7,167,269 B2
(45) Date of Patent: Jan. 23, 2007

(54) IMAGE FORMING DEVICE AND METHOD

(75) Inventors: Qingsu Wu, Ebina (JP); Masayoshi Sakakibara, Ebina (JP); Masatoshi Tagawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 920 days.

(21) Appl. No.: 10/372,127

(22) Filed: Feb. 25, 2003

(65) Prior Publication Data

US 2004/0066529 A1 Apr. 8, 2004

(30) Foreign Application Priority Data

Oct. 4, 2002 (JP) ............................. 2002-292965

(51) Int. Cl.
*G06K 15/00* (2006.01)
*G06K 1/00* (2006.01)

(52) U.S. Cl. .................................... 358/1.18; 358/1.14

(58) Field of Classification Search ............... 358/1.18, 358/1.14, 1.13, 1.9, 1.6, 1.5, 1.2, 1.17, 403, 358/404, 437, 426.11

See application file for complete search history.

(56) References Cited

U.S. PATENT DOCUMENTS 6,804,537 B1 * 10/2004 Fujii ........................ 455/557

6,911,986 B1 * 6/2005 Aneja et al. ................ 345/545

FOREIGN PATENT DOCUMENTS

| JP | A 10-74265 | 3/1998 |
| JP | A 11-134125 | 5/1999 |
| JP | A 2001-101091 | 4/2001 |

* cited by examiner

*Primary Examiner*—Douglas Q. Tran
(74) *Attorney, Agent, or Firm*—Oliff & Berridge, PLC (57) ABSTRACT

A device for printing a document, such as an HTML document, in which data to be incorporated into an output image can be described in the form of reference to an outside source, the device being capable of smooth printing a large document using a small memory. A document structural information manager creates document structural information which describes a structure of document elements, based on a result of analysis on an HTML document carried out by a document analyzer. During asynchronous downloading of substantial data of each document element, should work memory shortage occur, a memory manager unloads substantial data of a document element with a latter order at which to be incorporated into an output among those in the work memory, and saves the unloaded substantial data in an HDD. Thereafter, when data becomes no longer necessary as a result of being printed, the memory manager deletes the data from the work memory and reloads data saved in the HDD back to the work memory.

17 Claims, 9 Drawing Sheets

| DID | D-001 |
|---|---|
| DATA NAME | index.htm |
| PATH NAME | http://xxx.yyy.jp/ |
| SIZE | 12345 BYTE |
| ACQUISITION TIME | 10 SECONDS |
| DATA ELEMENT | E-001001 |

(a2)

| DID | D-002 |
|---|---|
| DATA NAME | image.jpg |
| PATH NAME | http://aaa.bbb.jp/ |
| SIZE | (UNCONFIRMED) |
| ACQUISITION TIME | (UNCONFIRMED) |
| DATA ELEMENT | E-001003 |

(a3)

| DID | D-003 |
|---|---|
| DATA NAME | Photo.pg |
| PATH NAME | http://ccc.ddd.jp/ |
| SIZE | 100 KB |
| ACQUISITION TIME | 30 SECONDS |
| DATA ELEMENT | E-001005 |

(b1)

| EID | E-001001 |
|---|---|
| ELEMENT TYPE | TEXT |
| RENDERING SIZE | 200 x 35 mm |
| NEXT ELEMENT | E-001002 |
| CONTENT | B-001001 |

(b2)

| EID | E-001002 |
|---|---|
| ELEMENT TYPE | LINK |
| RENDERING SIZE | (UNCONFIRMED) |
| NEXT ELEMENT | E-001004 |
| CONTENT | D-002 |

(b3)

| EID | E-001003 |
|---|---|
| ELEMENT TYPE | IMAGE |
| RENDERING SIZE | (UNCONFIRMED) |
| NEXT ELEMENT | (NONE) |
| CONTENT | (NOT ACQUIRED) |

(b4)

| EID | E-001004 |
|---|---|
| ELEMENT TYPE | IMAGE |
| RENDERING SIZE | 300 x 400 PIXELS |
| NEXT ELEMENT | E-001006 |
| CONTENT | D-003 |

(b5)

| EID | E-001005 |
|---|---|
| ELEMENT TYPE | IMAGE |
| RENDERING SIZE | 100 x 200 PIXELS |
| NEXT ELEMENT | (NONE) |
| CONTENT | B-001002 |

(b6)

| EID | E-001006 |
|---|---|
| ELEMENT TYPE | TEXT |
| RENDERING SIZE | 100 x 150 mm |
| NEXT ELEMENT | (NONE) |
| CONTENT | B-00100X |

(c1)

| BID | B-001001 |
|---|---|
| CONTENT | CONTENT OF TEXT··· |

(c2)

| BID | B-001002 |
|---|---|
| CONTENT | (CODED IMAGE) |

IMAGE FORMING DEVICE AND METHOD

BACKGROUND OF THE INVENTION

1. Field of the Invention

The present invention relates to an apparatus for acquiring display content data of each document element constituting a document from a description within the document or outside the document to create an output image for image formation.

2. Description of the Related Art

Along with an increase the frequency of printing hypertext documents such as HTML, XML, and XHTML-print, many printers have been developed which can accommodate hypertext documents. For example, Japanese Patent Publication Laid-open No. Hei 11-134125 discloses a printer device for acquiring and printing a hypertext document and document element data which constitutes the document from each server on the Internet. The process in which a printer itself downloads and prints hypertext document data is also referred to as pull printing.

Japanese Patent Publication Laid-open No. 2001-101091 discloses a pull-print system in which, in response to a request from a printer to acquire a part of hypertext document data, a proxy server collectively acquires the entire data containing the requested portion of data from the Internet and provides only the requested portion of data to the printer.

In printing a hypertext document, the printer analyzes the document from its beginning and, when it finds a description of a source file name and so forth of data to be incorporated into an output, sends a file acquisition request to a server on the Internet. Then, the file provided in response to the request from the server is developed into a bit map for incorporation into an output image, which is then printed on a predetermined medium such as a sheet of paper.

Here, data of each document element constituting a hypertext document may generally be stored in two or more different servers on the Internet. Therefore, acquisition of all data generally takes some time. Moreover, because a period of time necessary for data acquisition may vary depending on a response time of each server, and so forth, data may not always be acquired in the order of sending acquisition requests to the Internet. Therefore, it may often be the case that data of an element to be incorporated into a subsequent page is acquired before that for a preceding page.

In printing, an earlier page must be output earlier in order. Even though data for a subsequent page is acquired earlier, the data must be held in a printer, waiting for all data for its preceding page to become available, as it cannot be output before its preceding page. Therefore, in conventional printers, generally, all necessary data in printing a hypertext document is collectively downloaded to the printer before initiation of printing. This requires a printer to incorporate a large capacity storage device in order to print a large hypertext document, which causes cost increase.

Japanese Patent Publication Laid-open No. 2001-101091 discloses a solution to this problem. Specifically, this application discloses a technique in which, while monitoring free capacity in a process buffer within a printer, an acquisition request is sent for a portion of downloading data which can be stored in the free portion every time some free capacity becomes available in a process buffer. With this arrangement, required process buffer capacity can be suppressed.

The technique of Japanese Patent Publication Laid-open No. 2001-101091, however, may cause a problem such that, although a data acquisition request is sent every time some free capacity is secured in a process buffer, the requested data may not be acquired immediately depending on the state of a server holding the data or the Internet, which may cause delay in the printing. This application proposes as a solution to this problem, provision of a proxy server within a LAN to which the printer is connected, for collective data acquisition from the Internet, so that data can be provided from the proxy server to the printer. This is indeed a very effective solution, but it also has the disadvantage that it requires a large-scale system structure.

SUMMARY OF THE INVENTION

The present invention has been conceived in view of the above and can advantageously provide an image formation device for forming an image of a document the display content data of each document element of which must be acquired from outside the document, the device being capable of forming a relatively large document image using a relatively small capacity work memory.

In order to offer the above advantages, according to the present invention, there is provided an image forming device for analyzing a description of a document which contains two or more document elements, loading display content data of each document element found in the analysis to a work memory, forming an output image using a group of display content data in the work memory, and forming an image on a medium. In this device, document structural information which contains information on a structure between the document elements found in the analysis on the description is created based on a result of the analysis and, upon detection of shortage of a free region in the work memory, display content data which is selected from among the display content data loaded in the work memory based on the document structural information is unloaded from the work memory.

Examples of document structural information concerning a structure between document elements may include information concerning logical relationship among document elements, and information concerning layout of document elements in an output image (including information concerning an order at which to output the respective document elements in an output image).

In an embodiment of the present invention, a state of incorporation of each display content data loaded in the work memory into the output image is monitored so that display content data which is no longer necessary as has already been incorporated into the output image is deleted from the work memory.

In another embodiment of the present invention, whether display content data of each document element recorded in the document structural information is loaded in or unloaded from the work memory is managed and, when display content data which becomes no longer necessary as having been incorporated into the output image is deleted from the work memory, display content data presently unloaded from the work memory is reloaded to the work memory, beginning with the display content data which will first appear in the output image, with reference to the document structural information.

DESCRIPTION OF THE PREFERRED EMBODIMENTS

In the following, a preferred embodiment of the present invention (hereinafter referred to as an embodiment) will be described based on the accompanied drawings.

Figure 1:
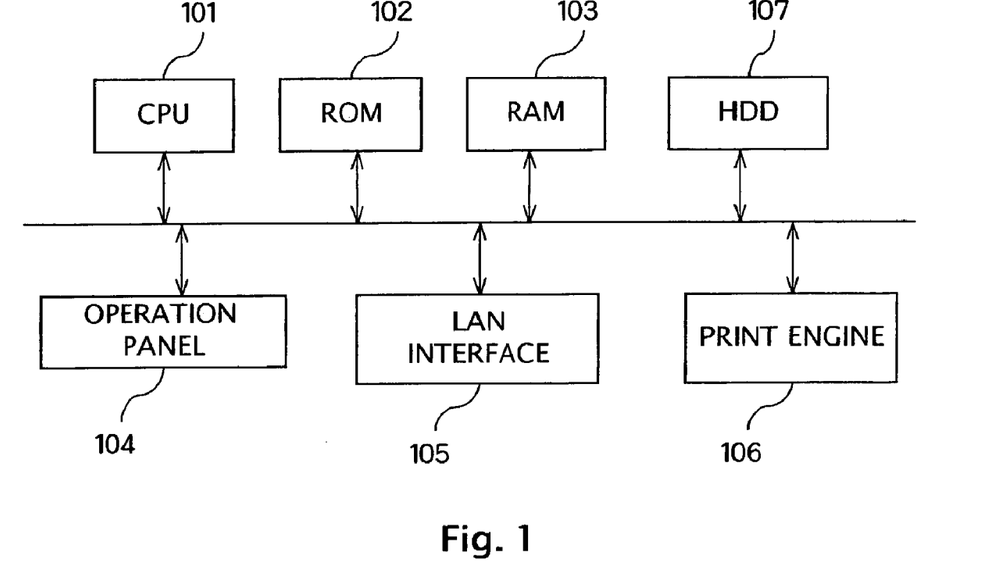
FIG. 1 is a block diagram showing an example of a hardware structure of a printer which incorporates the present invention.

FIG. 1 schematically shows an example of a hardware structure of a printer in this embodiment.

This printer comprises a central processing unit, or CPU, 101, a read-only-memory, or ROM, 102, a random-access-memory, or RAM, 103, an operation panel 104, a local area network, or LAN, interface 105, a print engine 106, and a hard disk drive, or HDD, 107.

The CPU 101 executes various kinds of control programs stored in the ROM 102 to thereby control the respective sections of the printer of the present invention so that the printer can execute various operations. The control programs include a program which describes a control operation for printing a document, such as HTML, XHTML-print, or the like, on the basis of a page. The page dividing will be described later in detail.

The RAM 103 serves as a working memory region, or a work memory, where the CPU 101 executes various kinds of programs, and may store printer receiving data (such as image data and HTML data) and developed data thereof, or bit map data. The operation panel 104 serves as a user interface via which to set print conditions in the printer and may comprise a touch panel liquid crystal display or various other input buttons.

The LAN interface 105 is responsible for communication with other devices over the LAN or those on the Internet via the LAN. The print engine 106 receives printing bit map data in response to a command from the CPU 101 and prints it on a medium such as a sheet. The HDD 107 is a non-volatile rewritable storage device and stores various kinds of programs and setting data set by a user or a service engineer. The HDD 107 may also serve as a stand-by area where overflowed data from the RAM 103 may stand by.

Figure 2:
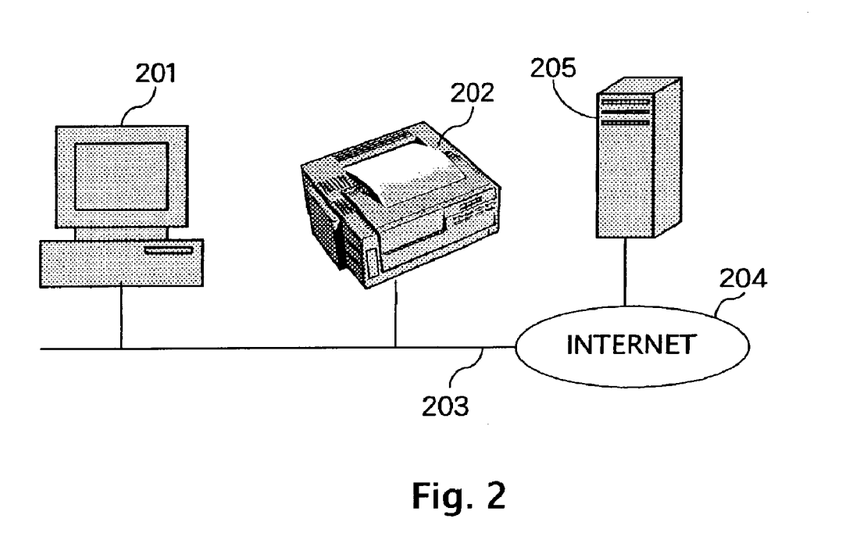
FIG. 2 is a diagram showing an example of a network environment in which the present invention is applied.

FIG. 2 shows an example structure of a system which employs the printer 202. In this example, a client PC (personal computer) 201 and a printer 202 are connected over the LAN 203. The client PC 201 and the printer 202 are both connected via the LAN 203 to the Internet 204, to which a server 205 is also connected.

In the system shown in FIG. 2, the client PC 201 or a mobile device (not shown), for example, sends printing HTML document data and a request for printing (a print request) the HTML document to the printer 202. Having received the request and data, the printer 202 analyzes the received HTML document data and creates bit map data for printing on a medium.

In the case where the HTML document accompanies an object (a document element) by including a uniform resource locator, or URL, or the like, which represents the object, the printer 202 downloads the object data in question from a server 205 in possession of the object over the Internet 204 according to the URL or the like, to complete the creation of bit map data. This method, specifically in which an HTML document is sent to the printer 202 for printing, is referred to as a direct print method.

Besides, the URL of a targeted HTML document may be directly input using the operation panel 104 of the printer 202 or sent from the client PC 201 or a mobile device, not shown, to thereby instruct the printer 202 to print (pull-print). In these cases, the printer 202 downloads the relevant HTML document from the Internet 204 according to the input URL to complete printing.

In this embodiment of the present invention, the printer 202 manages the RAM 103 in consideration of the structure of a printing document when it downloads data from a server and incorporates it into an output image for printing, as described above, so that the capacity of the RAM 103 serving as a work memory can be saved.

Figure 3:
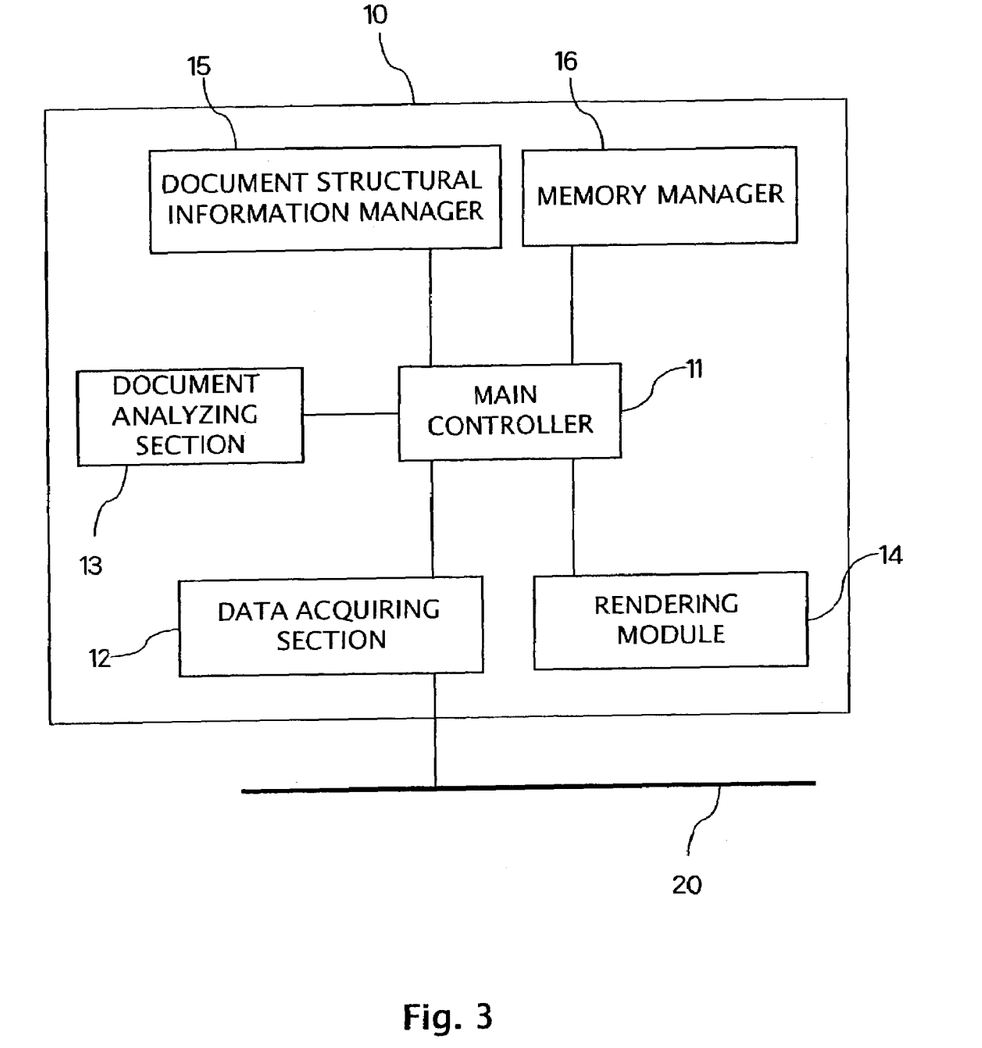
FIG. 3 is a block diagram schematically showing a structure of a document data processing structure in a printer in an embodiment.

A document data processing mechanism 10 of the printer 202, including the above-described memory management function, will be described with reference to FIG. 3. The processing mechanism 10 of FIG. 3 is realized by the CPU 101 by executing programs and setting data stored in the ROM 102 or the HDD 107.

In the processing mechanism 10, a main controller 11 is responsible for overall control of the processing mechanism 10. A data acquiring section 12 responds to a data acquisition request from the main controller 11 by acquiring data from a network, such as a LAN 20 or the Internet. A document analyzing section 13 analyzes an input HTML document or MIME (Multipurpose Internet Mail Extensions) document which incorporates an HTML document, to find a document element and detects information on a logical structure among these document elements. A document structural information manager 15 creates and manages document structural information based on the found document elements and the detected logical structural information (details will be described later).

It should be noted that a document element may comprise two types of elements. That is, for one type of a document element, data of its content (hereinafter referred to as "display content data" in the sense that the content is the result of printing the data) is incorporated into an MIME document, together with an HTML document, while, for the other type of a document element, the data is available with reference to an outside source. For the latter, the HTML document describes a document element in the form of link information, such as an URL, to the concerned externally available display content data. The document analyzing section 13 requests the data acquiring section 12 via the main controller 11 to download the concerned display content data.

Various data, including HTML document data, display content data of each document element found in an analysis of an HTML or MIME document from its beginning, structural information created and updated through the analysis, and the like, are stored in the RAM 103 serving as a work memory. It should be noted that display content data acquired from a MIME document which contains an HTML document or through downloading from an outside source may often be written in a description language, such as HTML or a page description language, and/or subjected to encoding or data compression. In such a case, the display content data must be developed or expanded into data in an image data format, such as a bit map image, so that the print engine 106 can handle it. This data development or expansion can be realized by means of software using the RAM 103 as a working area.

A rendering module 14 creates, in a page buffer which is separately provided from the RAM 103, an image of each page, beginning with the top page, based on the document structural information and display content data of each document element (or developed data thereof) stored in the RAM 103. The resultant page image is supplied to the print engine 106 for printing on a sheet.

The memory manager 16 controls the RAM 103 during processing using the above-described respective sections. Specifically, the memory manager 16 allocates a free space within the RAM 103 to each of the memory securement requests from the document analyzing section 13, the data acquiring section 12, and the rendering module 14, and frees a memory region where stored data is no longer necessary. In this embodiment, when remaining free space in the memory is not sufficient to accommodate a memory securement request or has been reduced to less than a predetermined value, the memory manager 16 unloads some of the display content data loaded in the RAM 103 to thereby free some of the occupied memory regions including those which are reserved for display content data to be loaded, in order to secure sufficient free space in the RAM 103 to accommodate a memory securement request.

It should be noted that "to unload" here refers to temporal free up of some regions in the RAM 103 which are secured or reserved for display content data. In freeing the region, data to manage the display content data and a freed region in the RAM 103 is preserved, while the display content data itself is deleted after being saved in a different storage device, although this deletion is not absolutely necessary. Therefore, in principle, display content data in an "unloading" region can be reloaded later into the RAM 103 from an outside source or a storage device into which the display content data is saved before the unloading.

To "delete" data from the RAM 103, on the other hand, refers to permanent erasure of data from the RAM 103. An example of such permanently erased data may be display content data of a document element having been incorporated into a printed page, except data which will be utilized later in other pages.

In this embodiment, data with less effect on subsequent printing, that is, data capable of being deleted and reloaded without delaying the printing (for example, data also recorded in a subsequent page, data of a relatively small volume, and so forth) is identified with reference to document structural information, and unloaded. This arrangement differs from data deletion management according to Least Recently Used, or LRU, algorithm which is generally used in management of a cache or virtual memory in a common computer. In this embodiment, display content data unloaded from the RAM 103 is stored in an HDD 107 having a relatively large volume and serving as a secondary storage device.

Figure 4:
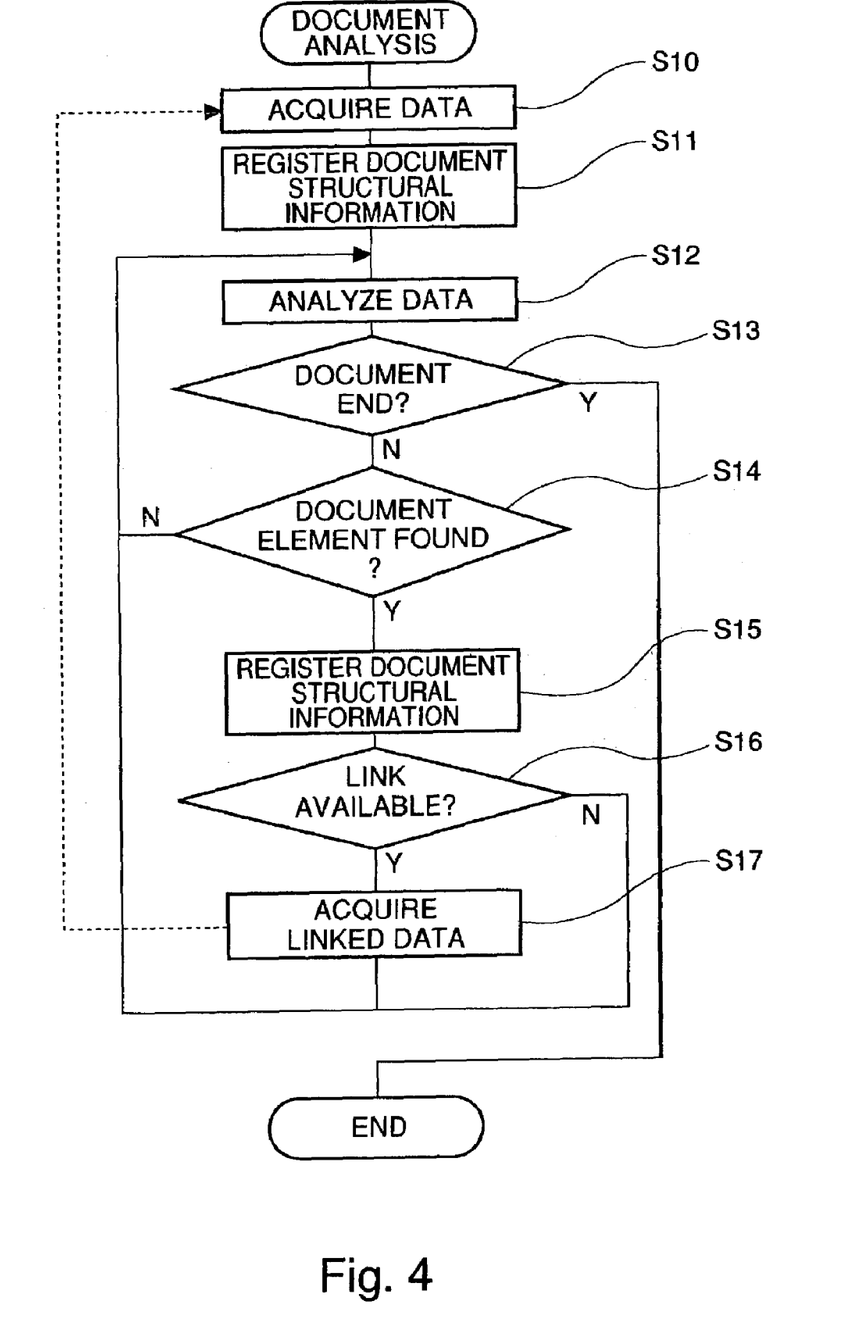
FIG. 4 is a flowchart of document analysis carried out by the printer in the embodiment.

FIG. 4 is a flowchart of processing by the document analyzing section 13 and the document structural information manager 15 in the document data processing mechanism 10.

For pull-printing, for example, when an URL of printing HTML document data is input from the client PC 201 or operation panel 104, the data acquiring section 12 issues a data acquisition request in the form of a GET command for HTTP 1.1, for example, through the LAN 20 to request acquisition of document data represented by the URL, and acquires document data supplied in response to the acquisition request from the LAN 20 or a server over the Internet connected to the LAN 20 (S10). The acquired document data is stored in the RAM 103. After the acquisition, information concerning the acquired document data is registered or recorded in the document structural information manager 15 (content of the information will be described later with reference to FIGS. 5 and 6) (S11).

Then, the document analyzing section 13 analyzes the document data sequentially from its beginning (S12). In this analysis, construction of the document data is sequentially checked. Data analysis continues until reaches the end of the document is reached (S13), and if any document element is found by means of tag detection (S14), information concerning the found document element is registered in the document structural information manager 15 and, should any of the registered documents or document element information be relevant to the newly registered document element, reflected in such documents and information (S15).

Here, when the document element is text incorporated into an HTML document, the incorporated text is considered as display content data of that document element, and information indicating the location of the display content data is registered in the document structural information manager 15. Generally, for a document element which is text incorporated into an HTML document, its display content data, that is the text itself incorporated into an HTML document, has been loaded to the RAM 103 by the time when the document element is found in analysis.

Meanwhile, when a document element is described as link information to substantial data (display content data), (for example, a URL of a source of an image to be incorporated into a document, which is described in an IMG tag), rather than being incorporated in an HTML document, data of the document element must be acquired through downloading or the like.

Therefore, the document analyzing section 13 determines if link information to data which is present in a different place is available in a description in the found document element (for example, URL of image data, which is described in an IMG tag) (S16), and, if available, acquires data according to the link information (S17). For link information indicating an outside URL, the data acquiring section 12 downloads the data identified by the URL from a server over the Internet. For link information indicating image data incorporated as code information (referred to as in-line image) incorporated in a MIME document which contains that HTML or in an XHTML-print document, the MIME document or XHTML-print document is further analyzed until the code data of the inline image is found.

It should be noted that the process of FIG. 4 is executed for every document data. (Note that not only HTML data but also any data, such as image data, to be referred to in the HTML data is regarded as one document data here.) Therefore, when acquisition of linked data is requested at S17, the process of FIG. 4 is separately initiated for that data to be carried out in parallel (concurrently) to the process for the original document data, as indicated by the broken line in FIG. 4. Such an asynchronous configuration is employed here because it is unknown when data may be acquired from the Internet. As for the linked data to which a data acquisition request is made at S17, data acquisition processing is carried out to acquire its concerned display content data, which is then registered in the document structural information manager 15.

In the following, with reference to FIGS. 5 and 6, document structural information managed by the document structural information manager 15 and creation of the document structural information will be described.

Figure 5A:
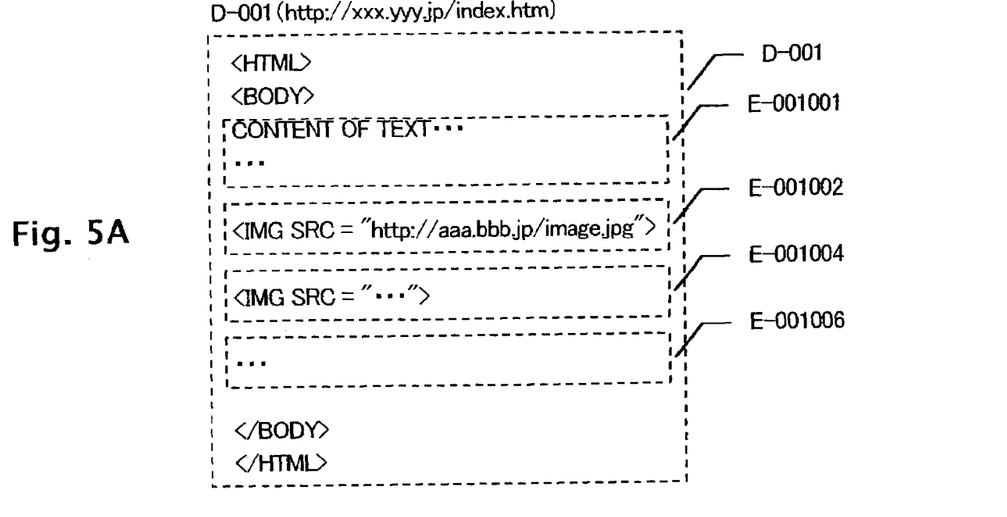
FIG. 5A–5B are diagrams schematically showing an example of a printing document and structural information obtained through document analysis.
Figure 5B:
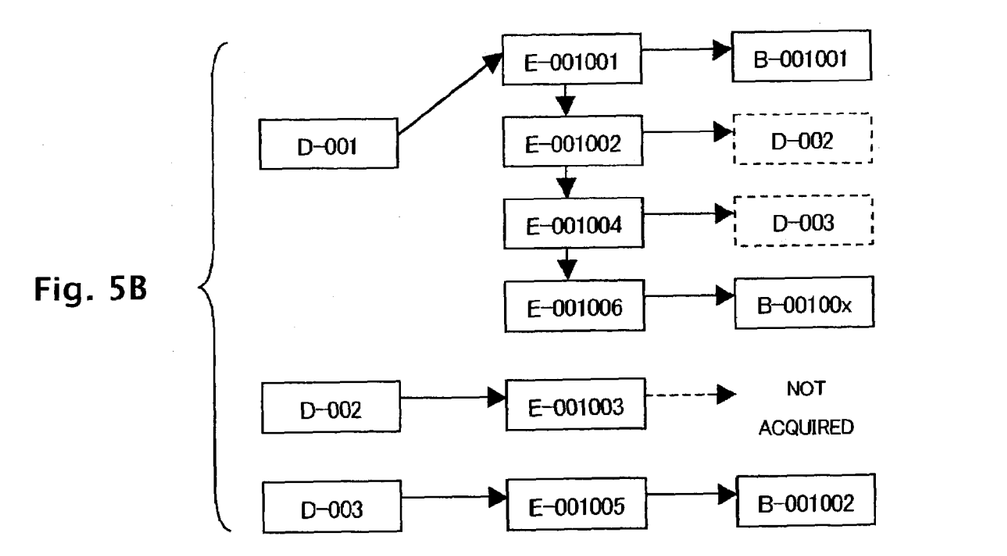

FIG. 5A schematically shows all descriptions of an input HTML document and correspondence between each description and a corresponding item for data management by the document structural information manager 15. FIG. 5B shows a data management structure for an HTML document, which is employed in the document structural information manager 15. FIG. 6 conceptually shows a snapshot, at a certain point of time, of document structural information managed by the document structural information manager 15.

All of the HTML descriptions of FIG. 5A constitute one document data. The document data is given a unique identifier D-001, which is imparted by the document structural information manager 15 when a URL of a printing document, namely http://xxx.yyy.jp/index.htm here, is input by a user or from the client PC 201. Further, corresponding management information (see (a1) in FIG. 6) is created, and stored in the RAM 103 so as to be retrievable using identifier D-001.

When the data acquiring section 12 downloads data of an HTML document corresponding to the URL, the document structural information manager 15 creates management information for the downloaded document data and registers any information relevant to the downloaded document data and known at that time in the created management information.

Figure 6:
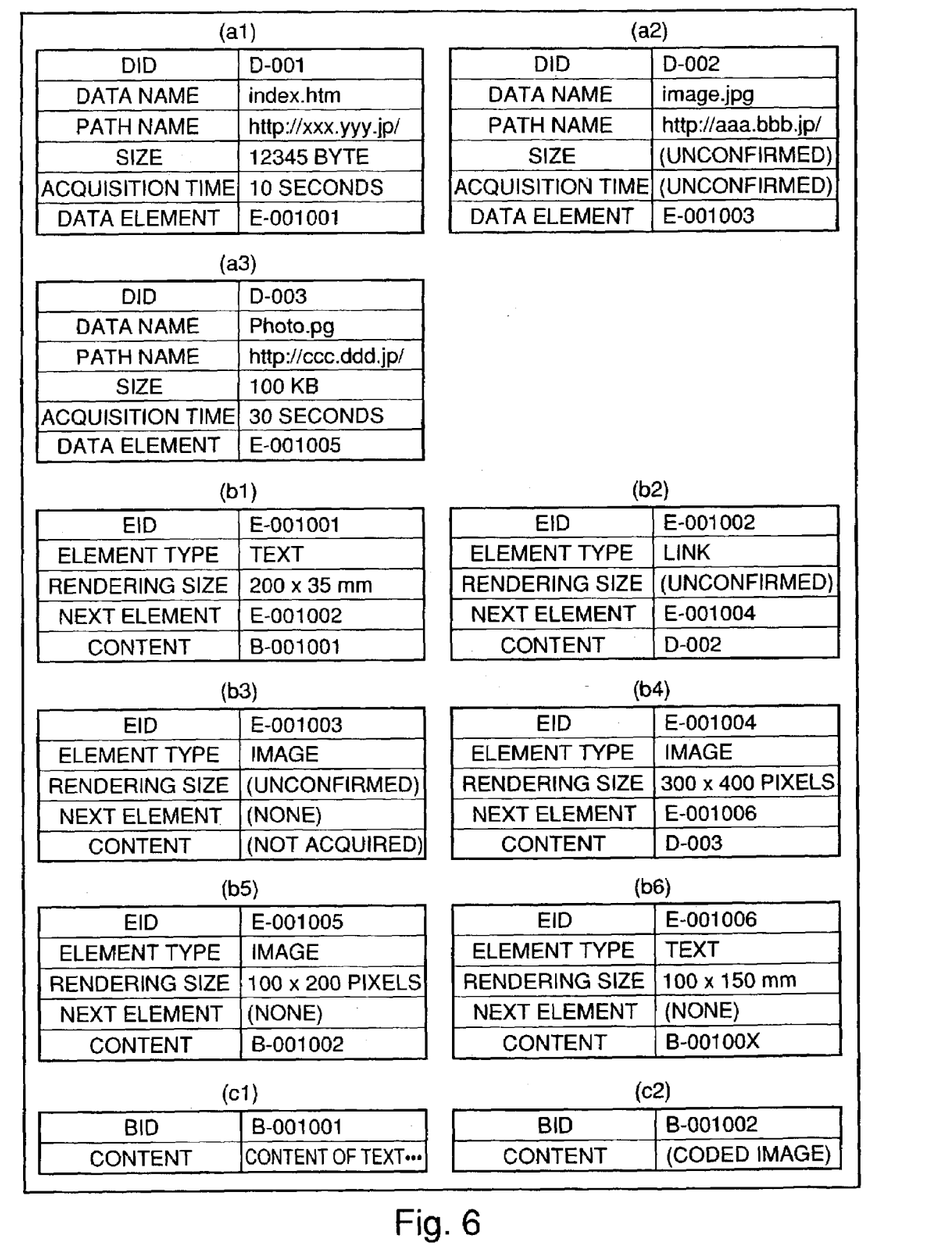
FIG. 6 is a diagram showing an example of document structural information obtained through analysis of the document of FIGS. 5A–51B.

For example, with reference to (a1) in FIG. 6, the management information created for the HTML documents D-001 comprises six items, namely (1) identifier (DID: document ID), (2) data name of the document (file name, obtainable from an URL), (3) path name indicating location of the document data (obtainable from a URL), (4) data size of the document data (known upon completion of downloading), (5) acquisition time (a period of time necessary to download), and (6) data element (a pointer to management information of a document element which first appears within the document, or a top document element). For an HTML document, all of these six items except for (6) data element are known by completion of downloading, and thus registered in management information.

In analysis of the construction of an HTML document from the top of its body part (<BODY> to </BODY>), a document element of text data is first found. The document structural information manager 15 imparts unique identifier E-001001 to the document element found. The document structural information manager 15 creates corresponding management information (see (b1) in FIG. 6) and stores it in the RAM 103 so as to be retrievable using identifier E-001001.

For example, with reference to (b1) in FIG. 6, the management information created for the HTML document E-001001 comprises five items, namely (1) identifier (EID: element ID), (2) type of the document element (text, table, list, image, link (reference information), etc) (3) rendering size of the document element (known upon confirmation of display content data) (4) next element (a pointer to management information of a document element which appears immediately after the present document element within the document data), and (5) content (pointer to display content data of the present document element). Note that the element type is known upon finding of the present text document element E-001001, and then registered in the management information. For text, in the case where layout conditions (page size, margin, font type, font size, feeding, and so forth, which may be defined in further detailed according to Cascading Style Sheets, or CSS, and so forth) are determined in advance, a rendering size can be known upon acquisition of the text data, and can then be registered.

The content of the element E-001001, which is text data here, is contained in the HTML document D-001. That is, the content of the element E-001001 is acquired at the time of finding the present element E-001001 (by recognizing an end tag, for example). The document structural information manager 15 imparts identifier (BID: block ID) B-001001 to the display content data (text), and stores it in the RAM 103 so as to be retrievable using identifier B-001001 (see (c1) in FIG. 6), and further registers a pointer (B-001001) to the display content data as the fifth item in the management information of the present element E-001001 (see (b1) in FIG. 6). It should be noted that "next element" in the management information of the element E-001001 is left blank as it is unknown at the present stage of analysis on the document data D-001.

When the top document element E-001001 is found in the analysis on the document data D-001 as described above, the document structural information manager 15 registers a pointer to the top element E-001001 as the sixth item "data element" in the management information of the document data D-001 (see (a1) in FIG. 6).

After processing the top element E-001001 as described above, the analysis on the HTML document D-001 proceeds until a document element having an image represented by an <IMG> tag is found. The document structural information manager 15 imparts a unique identifier E-001002 to the document element and creates corresponding management information (see (b2) in FIG. 6). In addition, as an element to follow immediately after the element E-001001 is now found, a pointer to this element is registered in the management information of the element E-001001.

As the content of the element E-001002 is described as link information (http://aaa.bbb.jp/image.jpg here), "type of element" in the management information of the element E-001002 is filled with information indicating that the content of the element E-001002 is linked information, and relevant data and path names are registered according to the linked information. "Rendering size" is left "unconfirmed" at this stage as it is unknown until the linked information is acquired.

When a document element with its display content data described in the form of link information to outside data is found, downloading is initiated, as described above, to acquire the linked data (S17 in FIG. 4). The document structural information manager 15 imparts unique identifier D-002 to the downloading data and creates management information. Upon completion of the downloading as described above, information concerning that data is registered in the management information (see (a2) in FIG. 6).

As described above, in this embodiment, downloading data from outside the printer 202 and data contained in an HTML document are conceptually discriminated. Specifically, the former is given identifier DID and treated as a document, while the latter is given identifier EID and treated as an element. Likewise, image data to be downloaded according to link information in connection with the document element E-001002 is imparted identifier D-002 to be treated as document data and management information (a2) is created, in which "size" and "acquisition time" are left "unconfirmed" until completion of the downloading.

Because the downloading data D-002 is image data, the document structural information manager 15 imparts unique identifier E-001003 to the image data to treat it as a document element, and creates management information (see (b3) in FIG. 6). "Type of element" of the element E-001003 is known as an image at this stage, while a "rendering size" is unknown until completion of development of the compressed data and thus left "unconfirmed" at this stage in the management data. "Content" of the element E-001003 is also left "not acquired" as content is not confirmed until completion of the downloading. "Rendering size" and "content" are registered when the downloading is completed.

Upon completion of the downloading, the size of the downloaded data and a necessary acquisition time are determined, and thus registered in "size" and "acquisition time" for document data D-002. Substance of the downloaded image data is stored as information identifiable using block ID (BID). Specifically, the block ID is registered in the "content" for E-001003. The size of an image is determined based on the attribute information of the downloaded data and registered in the "rendering size".

In the case where the link information of a document element refers to data incorporated in an HTML document (for example, an in-line image, hereinafter referred to as in-line data), the data can be managed using a similar hierarchical structure, originated from the linked data and including document data, document element data, and substantial data. In this case, "data name" in the management information at the level of document data may contain, for example, an identifier of the linked data identified by the link information. In this case, however, management information at the level of document data is not mandatory because downloading is unnecessary. Determination as to whether or not linked data is contained in an HTML document may be made basically such that link information described in the form of a URL generally indicates data available outside the HTML document, and link information in the form of cid: (content ID), which is a form used in a MIME or XHTML-print document to refer to attached data, generally indicates data contained in the HTML document.

Returning to the analysis on the document data D-001, when a document element with an <IMG> tag is found after the document element E-001002, the document structural information manager 15 manages the element using identifier E-001004 (see (b4) in FIG. 6), and downloading data according to the link information shown in the tag, using identifier D-003. In addition, a pointer to the next element E-001004 is registered in the management information for the element E-001002. Further, image data in the data D-003 is managed as document data E-001005 (see (b5) in FIG. 6). Still further, as substantial data of this image data is then present for this element, the substantial data is managed using identifier B-0010002 (see (c2) in FIG. 6).

Further analysis on the document data D-001 next finds a text element after the element E-001004. The text element is managed as E-001006 and a pointer to its substantial data B-00100x is registered in its management information (see (b6) in FIG. 6).

Analysis on an HTML document, as shown in FIG. 5A, and creation of corresponding document structural information are performed as described above with reference to the example document structural information of FIG. 6. The illustrated document data and a group of management information for these document elements in FIG. 6 constitute document structural information. FIG. 5B shows, using arrows, correspondence between management information and substantial data created or acquired as the analysis of FIG. 5A proceeds. In the drawing, solid line blocks represent management information and substantial data of document data and document elements, and broken line blocks represent a link to outside of an HTML document.

As described above, document structural information is created according to the analysis of FIG. 4 and updated as the analysis and downloading proceed. In this embodiment, in parallel to the analysis, the main controller 11 and the rendering module 14 perform image creation for printing. This will be described with reference to FIG. 7.

Figure 7:
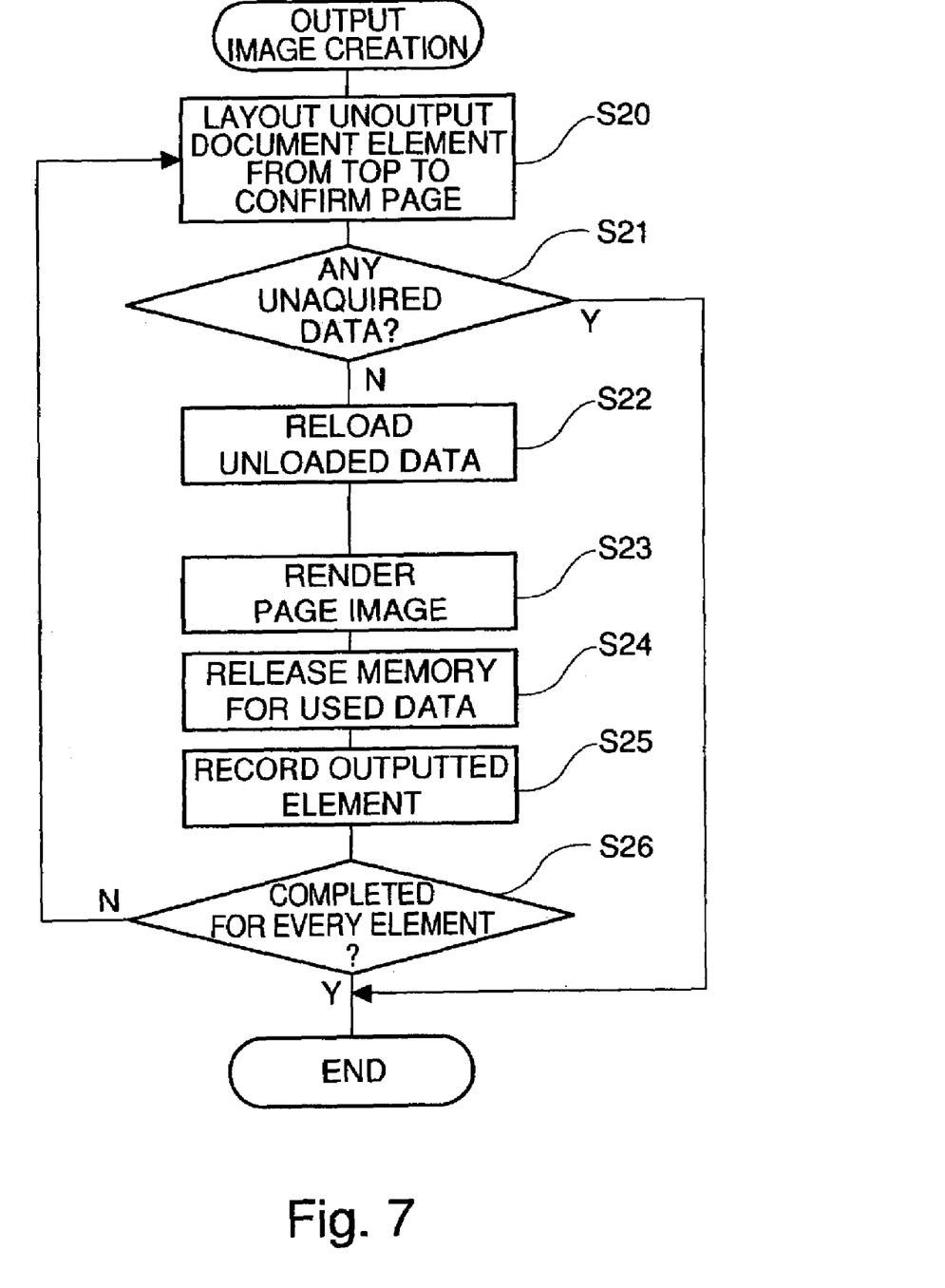
FIG. 7 is a flowchart of creation of an output image carried out by the printer in the embodiment.

Image creation is executed every time the content of the document structural information manger 15 is updated. Referring to the document structural information manger 15, the main controller 11 creates a tentative layout of document elements yet to be output, sequentially from the top document element, to thereby obtain a group of document elements to be incorporated in a first page yet to be output (S20). The tentative layout can be achieved by virtually arranging a region having a size of that of each document element yet to be output, beginning with the top document element, according to layout condition (actual rendering of substantial data into a page buffer may be applied, though this is not necessary).

In preparation of the tentative layout, whether or not all of the display content data of the document elements to be incorporated into the concerned page have been acquired is determined (S21). If any display content data are not acquired yet, the layout processing is terminated as that page cannot be completed. When all display content data have been acquired and that page is thus able to be completed, on the other hand, display content data which is registered in the document structural information but not present in the RAM 103 because of the dynamic unloading for securing memory capacity (details to be described later), if any, is loaded again (S22). Note that, when all display content data is loaded in the RAM 103, reloading is not necessary.

When display content data for all document elements to be incorporated in a page is loaded in the RAM 13, the rendering module 14 renders, in the page buffer, an output image of that page (S23). Upon completion of page rendering, the main controller 11 instructs the print engine 106 to output for printing the page image rendered in the page buffer, and issues to the memory manager 16 a command to release a memory region where the respective display content data having been incorporated into the page image are held (S24, memory release will be described later in detail).

It should be noted that, as for a document element which is linked to inline data contained in an HTML document, the inline data may possibly be referred to by a different document element in the document. Therefore, as for display content data which is inline-data referred to by a document element, it is preferable that a memory region for that data may be refrained from being released. Whether or not the rendered display content data is inline-data may be determined with reference to the data or path name shown in document structural information at the level of document data (DID).

Upon completion of the page rendering, the main controller 11 causes the document structural information manger 15 to record the fact that the respective document elements incorporated into the concerned page have been output (S25). Alternatively, instead of recording the fact that the elements have been output, management information of these document elements may be deleted. Then, the main controller 11 determines if rendering and outputting of the document elements contained in the HTML document and those which are referred to in the process originated from the HTML document have all been completed (S26). If not, the operation process returns to S20 to continue rendering of a document element yet to be output.

According to the above-described processing of FIG. 7, in creation of an output image, a range for the following page is determined every time a page image is printed. This, however, is merely an example and, alternatively, page dividing based on a result of analysis (that is, allocation of a group of document elements to a page, beginning with the first page) may be performed independently of the creation of an output image, so that a group of document elements for a first unprocessed page may be known in creation of an output image, based on the result of page dividing.

The printer 202 in this embodiment carries out printing of an HTML document while performing the analysis of FIG. 4 and the output image creation of FIG. 7. Here, when the capacity of the RAM 103 is relatively small in comparison with the size of a printing document, memory shortage may be expected in the process of data downloading, compressed data development, and management information creation. In this case, in this embodiment, the memory manager 16 unloads some of the data loaded in the RAM 103 (temporary deletion) to compensate for the memory shortage. This flow will be described with reference to FIG. 8.

Figure 8:
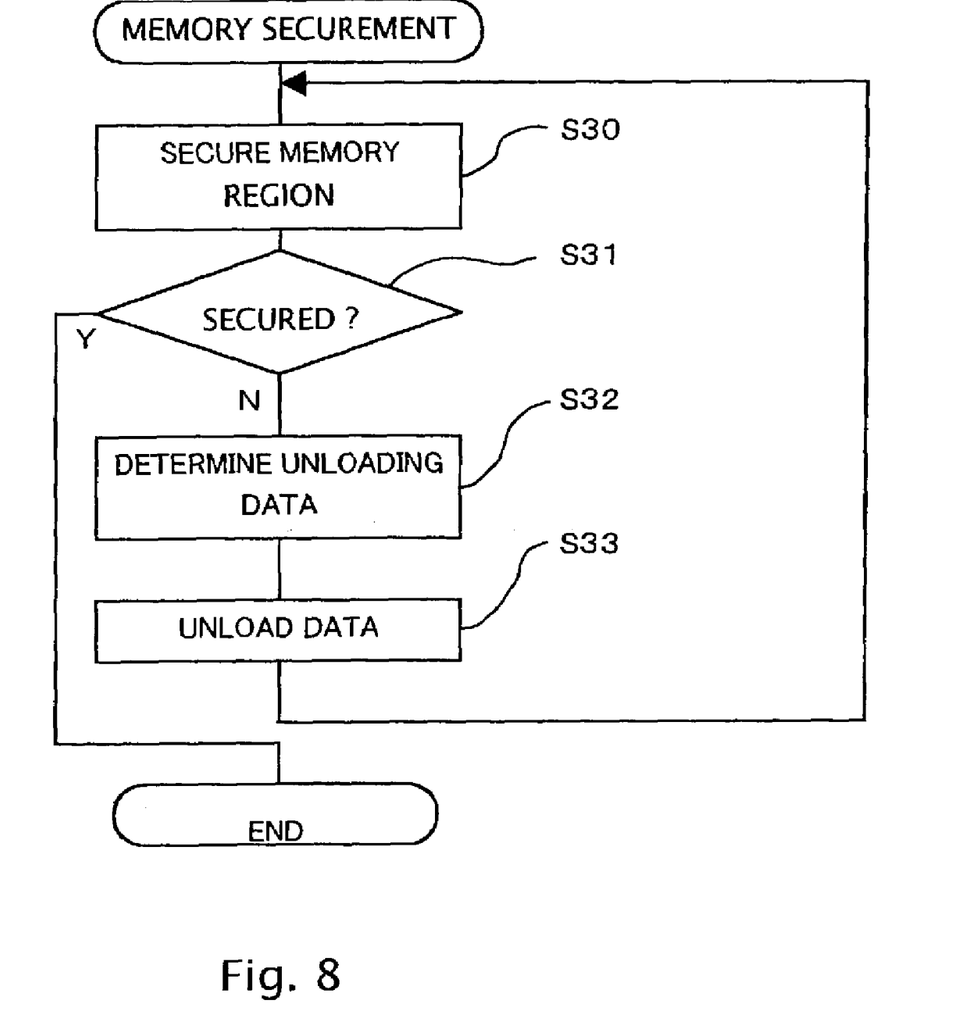
FIG. 8 is a flowchart of securing of a memory region carried out by the printer in the embodiment.

Upon issuance of a memory securement request to the memory manager 16 in the process of downloading and so forth, the memory manager 16 attempts to secure a memory region in a requested size in a free region in the RAM 103 (S30). When a memory region in such a size can be secured (Y for S31), this process completes. However, when a memory region in such a size cannot be secured (N for S31), the memory manager 16 refers to the document structural information manager 15 to determine a document element to be unloaded from the RAM 103 (S32). Thereafter, display content data of the determined element is unloaded from the RAM 103 and stored in an HDD 107 (S33).

Unloading display content data may be selected from among those which are presently loaded in the RAM 103, beginning with the display content data which appears on the latest page (i.e., display content data to be printed on the latest page). As is known from FIG. 5B, an order of appearance of the respective document elements in an HTML document can be known with reference to the document structural information. For an HTML document, an order of outputting for printing (displaying) the document elements is substantially identical to that of appearance of the elements in the description in the HTML document. Therefore, when an order of appearance of the respective document elements corresponding to the display content data present in the RAM 103 is known from the document structural information, it is possible to select, as unloading data, display content data of an element with the latest appearance order. It should be noted that, when a style is set based on style information such as CSS, an order of appearance of the respective document elements on an output page can be known based on the document structural information and the style information, so that these can be similarly processed thereafter.

After unloading the thus selected unloading display content data, the operation process returns to S30 to execute again an attempt to secure a memory region in a requested size. When a memory region in such a size can not be secured, the processing at S32 and S33 is repeated to unload another portion of the display content data until a memory region in the requested size can be secured.

In the above, display content data of a document element to be output last in view of a page sequence at the present stage is unloaded one by one. Alternatively, in the case where the data size of the display content data of a document element is known, which is often the case, display content data of an amount necessary to secure a memory region in the requested size may be collectively unloaded at S33.

Figure 9:
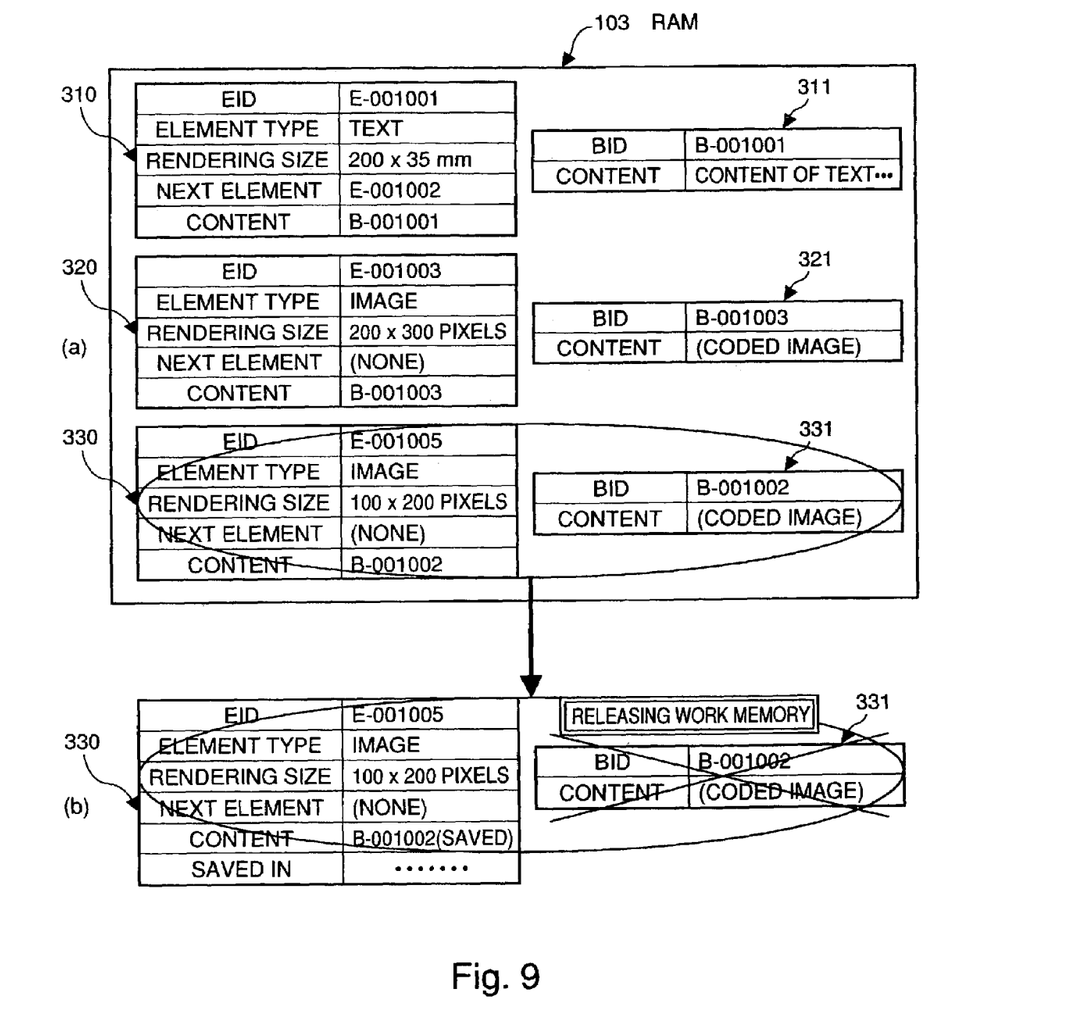
FIG. 9 is a diagram explaining selection of unloading data.

FIG. 9 is a diagram explaining this unloading. (a) in FIG. 9 shows data content within the RAM 103 at the time when it is determined that a memory region in a requested size cannot be secured. Management information 310, 320, 330 for three documents elements and substantial data 311, 321, 331 for the respective elements are then loaded in the RAM 103 (management information at an upper level of document data are not shown). When it is determined, based on the document structural information, that the document element 330 appears on the latest page, the substantial data 331 of the document element 330 is unloaded from the RAM 103 (a work memory), and stored in the HDD 107, as shown in FIG. 9B.

Accompanying the unloading of the display content data of a document element, information to the effect that the display content data has been unloaded and information for use in retrieval of the unloaded data which is now saved in the HDD 107 (for example, address information such as a file name) are recorded in the management information of that element. In the example of (b) in FIG. 9, a flag indicating whether or not the display content data is unloaded is set in the "content" of the management information, and, for unloaded data, address information concerning a place where the data is now saved is recorded in the "saved in".

In the above, display content data to be incorporated into the last output page is first unloaded. This unloading criterion makes it possible to minimize reduction of the number of pages which are continuously printable using a group of display content data present in the RAM 103. In addition, because a sufficient period of time can be ensured between when the display content data is unloaded and when the unloaded display content data becomes necessary, there may be increased chances to reload the unloaded data. This can minimize the risk of delaying the subsequent printing due to the unloading. As described above, the unloading criterion in this embodiment enables selection of unloading data with least effect on the subsequent printing.

It should be noted that, according to the unloading criterion in this embodiment, two or more display content data on the same page may be given different unloading priority. Employment of additional criterion "in the case where two or more display content data are present on one page, data with a larger volume will be first unloaded" enables more effective unloading as unloading data with a larger volume results in releasing a larger memory region. Employment of this additional criterion can be achieved by allocating in advance a group of display content data in the RAM 103 to pages (page dividing). In the case where there are some display content data yet to be acquired, the page dividing is tentative, and therefore a modified criterion from the above by substituting "one page" by "a suitable range determined depending on the state of data acquisition" may be employed.

Besides determination of an output order in units of pages, as described above, display content data in the RAM 103 may be unloaded, simply beginning with the display content data to be last incorporated in an output.

The thus unloaded display content data must be returned to the RAM 103 by the time the display content data is output for printing. Therefore, according to the procedure of FIG. 7, the unloaded display content data is reloaded when a page on which the unloaded display content data is to be incorporated is output. However, data reloading at the time of creation of a page image as described above may delay the printing. In view of the above, in this embodiment, some of the unloaded display content data is reloaded beforehand to a memory region which becomes available as a result of releasing a memory region with used data, so that only a reduced amount of data must be reloaded at the time of outputting the concerned page. The process of "beforehand" unloading described above is shown in FIG. 10.

Figure 10:
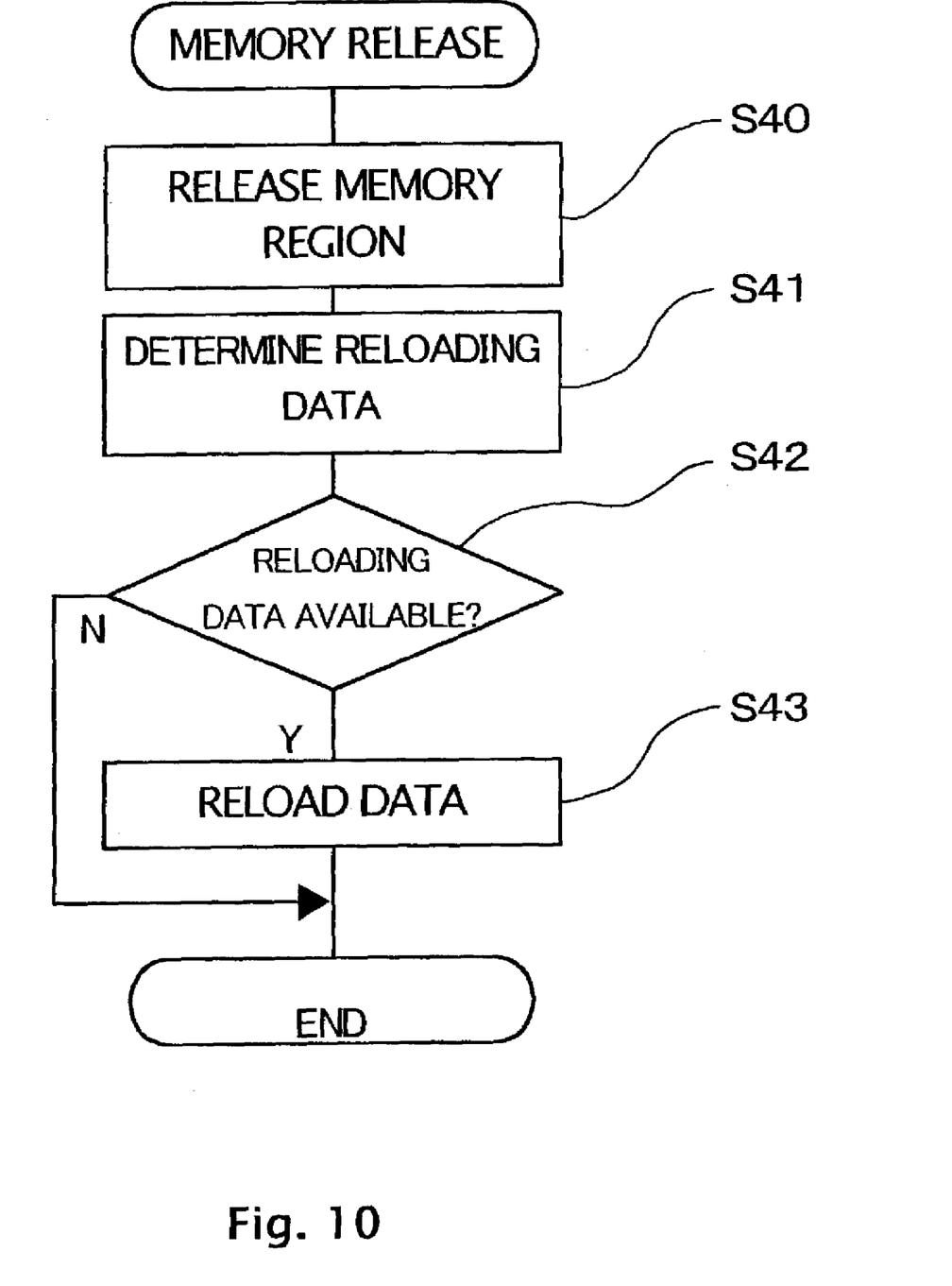
FIG. 10 is a flowchart of memory releasing carried out in the printer in this embodiment.

According to this procedure, upon receipt of a memory release command as for used data in creation of an output image, the memory manager 16 releases a region in the RAM 103 where the commanded data is stored (S40). After the release, the memory manager 16 determines display content data to be reloaded to the released memory region (S41) by specifying a group of presently unloaded document elements based on information provided from the document structural information manager 15 and by selecting display content data in the group which is to be incorporated in a page to be first output (alternatively, display content data with the earliest appearing order in an HTML document). Determination of reloading data according to this criterion enhances the possibility that display content data to be incorporated in a page to be output are all loaded in RAM 103 at the time of outputting the page.

Here, even though data to be first output among unloaded data is selected as reloading data, as described above, when the page to incorporate the selected reloading data is scheduled to be output much later than the current page, that reloaded data may possibly be unloaded again before printing the concerned page. This is nothing but a waste. In order to avoid this waste, the above criterion may preferably be modified into "when display content data to be first output among those which are currently unloaded is to be incorporated into a page to be output within a predetermined number of pages from the current page, the display content data is going to be reloaded, and when it is not, that data is not then reloaded". This example criterion is modified based on the number of pages left to be printed after the current page.

Alternatively, the example criterion is modified based on the length of an image to be printed after the document element being currently rendered in the page buffer (i.e., the sum of rendering sizes of the respective elements (in the page advancing direction) from the element immediately after the element being currently rendered to that immediately before the unloaded element to be first output (the first output unloaded document element)).

As another alternative, whether or not the number of elements which intervene between the current document element and the first output unloaded document element is smaller than a predetermined value may be based on in determination of reloading data. As yet another alternative, the determination may be based on whether or not the number of elements with unconfirmed rendering size among those between the current document element and the first output unloaded document element is smaller than a predetermined value. In this case, when the number of document elements with an unconfirmed rendering size is smaller than a predetermined value, the first output unloaded document element is going to be reloaded, and when it is not, that element is not then reloaded.

Alternatively, at determination of a reloading data, the size of a released memory region and the size of display content data of each document element may be taken into consideration so as to select, for collective reloading, a group of display content data of an amount which can be stored within the released memory region of that size, beginning with the first output display content data.

When no reloading data is selected at S41 (N for S42), no data is then reloaded. When any reloading data is selected at S41 (Y for S42), a place where the respective display content data are now saved (see (b) in FIG. 9) is determined with reference to the document structural information manager 15 so that the display content data is read therefrom and reloaded to the RAM 103 (S43). After reloading the display content data, an unload flag serving as management information of a document element corresponding to the display content data is reset so that it can be known from the management information that the data is now loaded in the RAM 103.

It should be noted that display content data which is not reloaded to the RAM 103 when a memory region is partly released, as shown in FIG. 10, is reloaded, by the latest, when the concerned page is output, as shown in FIG. 7 (S22).

Besides the timing of memory releasing and page-outputting, data reloading may be periodically applied using a timer, for example. Reloading data for periodic reloading may be selected according to the same criterion as that for data reloading in memory releasing.

When reloading data is selected at S41, it is possible that the amount of the selected reloading display content data will exceed free capacity of the RAM 103 which is determined as available in consideration of also being subjected to memory release. In this case, data reloading may be refrained from. Alternatively, data may be further unloaded to increase free memory capacity before the reloading. In the latter, it is desired that output orders are compared between reloading data and unloading data, and that, when reloading data is scheduled to be output later than the unloading data, reloading should be refrained from.

As described above, in this embodiment, a structure between elements contained in a document is memorized so that unloading data is selected from among the display content data available in the RAM 103 based on the structural information. This makes it possible to manage the RAM 103 more suitable for the structure of the document, in comparison with general memory management such as an LRU method.

Here, in parallel acquisition of display content data of the respective elements found in analysis, it may happen that, for example, while acquisition of display content data of an element to be incorporated into the first page of a document is taking a relatively long time, the free region in the RAM 103 is being occupied by subsequent data, which are smoothly acquired, until only a small free region is left. In this case, at the time of completion of data acquisition for an element on the first page, data of other elements which are now present in the RAM 103 may need to be unloaded in order to load the data of the element of the first page. In order to cope with this case, according to an LRU method, first acquired data must be unloaded. This may cause a disadvantage such that, should the first acquired data, which is determined to be unloaded according to an LRU method, concern another element to be incorporated in the first page, the first page cannot be printed until the first acquired data is once unloaded and then reloaded, even though the data for the first page has all been available before the unloading.

In this embodiment, because unloading data is determined in consideration of a structure between elements of a document, which element is to be incorporated into the first page can be known based on this structural information. Therefore, the above disadvantage can be avoided.

In particular, as an order at which the respective document elements appear in an output pages can be known from document structural information in this embodiment, when display content data is unloaded beginning with the display content data with a latter appearance order according to the known order, more chances can be created to reload the unloaded data before it becomes necessary. This enables memory management which can less adversely affect the subsequent printing.

In addition, in this embodiment, because data on a document element which is no longer necessary is deleted from the RAM 103 every time a page image is output, a memory region in the RAM 103 can be effectively utilized. Further, because once-unloaded display content data is reloaded when an increased free region is secured in the RAM 103 through release of a memory region, smooth printing can be achieved. In particular, selection of reloading data from among unloaded display content data, beginning with the first output data, can reduce adverse effects on printing.

In the above, the printer 202 has an HDD 107 so that the unloaded data from the RAM 103 can be saved in the HDD 107. However, there is a printer without a large volume secondary storage device, such as an HDD. When the method of this embodiment is applied to such a printer, display content data unloaded from the RAM 103 would otherwise be lost from the printer as there is no place to save it. In this embodiment, because the document structural information manager 15 possesses information of an unloaded document element in the form of "data name" and "path name" indicative of the original location of the display content data, the data can be reloaded, by downloading, from the location to the RAM 103. That is, the memory management method in this embodiment is applicable to a printer without a secondary storage such as an HDD.

Criterion for determination of unloading or reloading data employed when this method is applied to a printer without a secondary storage may be similar to that when the method is applied to a printer with a secondary storage. That is, data with a latter order to be incorporated into an output may be first selected for unloading, and data with an earlier order to be incorporated into an output may be first selected for reloading.

Here, a printing order may be determined in units of pages when a page printer is employed. When two or more display content data are present in the same place, an unloading order may preferably be determined such that data with a shorter "acquisition time" shown in the document structural information may be first selected for unloading. This selection criterion enables reduction of a reloading time, causing less adverse effect on the printing.

Although a page buffer is separately provided from the RAM 103 in the above, for a simpler structure, a page buffer may be incorporated into the RAM 103.

Although a page printer is referred to in the above, the memory management method in this embodiment can be applied to a printer other than a page printer, as is obvious from a basic concept of the method. For example, the method can be applied to a printer for continuous printing on a rolled paper or the like. In this case, should memory work area shortage occur, information on the structure of a printing document is managed so that data is unloaded beginning with data with less adverse effect on the printing (for example, data to be output later) with reference to the structural information. This allows smooth printing.

Although information on a document structure (document structural information) obtained by analyzing a document is managed so as to be referred to in selection of unloading or reloading data in the above, information on an output order or layout (positional relationship among respective elements on an output page or a series of output images) of each document element may be created based on the document structural information so that unloading or reloading data can be determined based on the output order or layout information. The output order or layout information may be considered as one type of document structural information.

Although an HTML document is referred to in the above, the present invention can be applied to any image forming device for forming an image of a general document, such as an XML, XHTML-print, in which data to be incorporated into an output data can be described in the form of a reference to an outside document.

It should be noted that the above embodiment is described only for the purpose of showing an example and that various modifications can be applied to the present invention without departing from the scope of the present invention.

What is claimed is:

1. An image forming device for analyzing a description of a document which contains two or more document elements, loading display content data of each document element found in the analysis to a work memory, forming an output image using a group of display content data in the work memory, and forming an image on a medium, comprising:
   a document structure manager for creating document structural information which contains information on a structure of the document elements found in the analysis on the description, based on a result of the analysis; and
   an unload controller for unloading from the work memory, upon detection of shortage of a free region in the work memory, display content data which is selected from among the display content data loaded in the work memory based on the document structural information.

2. The image forming device according to claim 1, wherein the unload controller determines an order at which display content data of each document element appears in the output image, based on the document structural information, and unloads display content data beginning with the display content data with a later order.

3. The image forming device according to claim 1, further comprising:
   a secondary storage device;
   a save controller for saving the display content data of a document element unloaded from the work memory by the unload controller; and
   a reload controller for acquiring, when display content data of a document element is incorporated into the output image and the display content data is not present in the work memory, the display content data from the secondary storage device to reload to the work memory.

4. The image forming device according to claim 2, wherein
   the document structure manager creates the document structural information which contains information on a size of display content data of each document element loaded to the work memory, and the unload controller determines an order and a position for each document element appearing in the output image, and unloads the display content data, beginning with display content data with a larger size, when two or more document elements appear in a predetermined range.

5. The image forming device according to claim 1, comprising:

a recorder for recording information indicating a source from which display content data of each document element loaded in the work memory is acquired, in the document structural information; and a reload controller for acquiring again, when display content data of document element is incorporated into the output image and the display content data is not present in the work memory, the display content data from the source of the display content data to reload to the work memory, the source being known with reference to the document structural information.

6. The image forming device according to claim 5, wherein the document structure manager records information indicating a period of time necessary in acquisition of display content data of each document element loaded to the work memory, in the document structural information, and the unload controller determines an order and a position for each document element appearing in the output image, and unloads the display content data, beginning with display content data with a shorter period of time necessary in acquisition, when two or more document elements appear in a predetermined range.

7. The image forming device according to claim 4, wherein the two or more document elements appearing in a predetermined range are two or more document elements appearing in the same page.

8. The image forming device according to claim 6, wherein the two or more document elements appearing in a predetermined range are two or more document elements appearing in the same page.

9. The image forming device according to claim 1, further comprising:

a delete controller for monitoring a state of incorporation of each display content data loaded to the work memory, into the output image, and deleting display content data which is no longer necessary as having been incorporated into the output image, from the work memory.

10. The image forming device according to claim 9, further comprising:

a content manager for managing whether display content data of each document element recorded in the document structural information is loaded in or unloaded from the work memory; and a reload controller for reloading, when display content data is deleted from the work memory by the delete controller, display content data among display content data unloaded from the work memory to the work memory, beginning with display content data which first appears in the output image, with reference to the document structural information.

11. The image forming device according to claim 10, wherein the reload controller refrains from reloading display content data to the work memory, the display content data being first to appear in the output image among the display content data unloaded from the work memory, when the display content data is away from first display content data in a group of display content data yet to be incorporated into the output image by farther than a predetermined length.

12. A method for use in an image forming device for analyzing a description of a document which contains two or more document elements, loading display content data of each document element found in the analysis to a work memory, forming an output image using a group of display content data in the work memory, and forming an image on a medium, comprising the steps of:

(a) creating document structural information which contains information on a structure of the document elements found in the analysis on the description, based on the result of the analysis; and (b) unloading from the work memory, upon detection of shortage of a free region in the work memory, display content data which is selected based on the document structural information from among the display content data loaded in the work memory.

13. The method according to claim 12, wherein, at the step (b), an order at which display content data of each document element appears in the output image is determined based on the document structural information so that display content data is unloaded, beginning with display content data with a later order.

14. The method according to claim 12, further comprising the steps of:

saving, at the step (b), the display content data of a document element unloaded from the work memory in a secondary storage device; and loading, when the display content data unloaded from the work memory is reloaded to the work memory, the display content data from secondary storage device to the work memory.

15. The method according to claim 12, further comprising the steps of:

recording information indicating a source from which display content data of each document element loaded in the work memory is acquired, in the document structural information; and acquiring again, when the display content data unloaded from the work memory is reloaded to the work memory, the display content data from a source of the display content data which is known with reference to the document structural information.

16. The method according to claim 12, further comprising the steps of:

monitoring a state of incorporation of each display content data loaded to the work memory, into the output image, and deleting display content data which is no longer necessary as having been incorporated into the output image, from the work memory.

17. The method according to claim 16, further comprising the steps of:

managing whether display content data of each document element recorded in the document structural information is loaded in or unloaded from the work memory; and reloading, when display content data is deleted from the work memory at the step of deletion, display content data among display content data unloaded from the work memory to the work memory, beginning with the display content data which first appears in the output image, with reference to the document structural information.

* * * * *